UNITED STATES PATENT OFFICE.

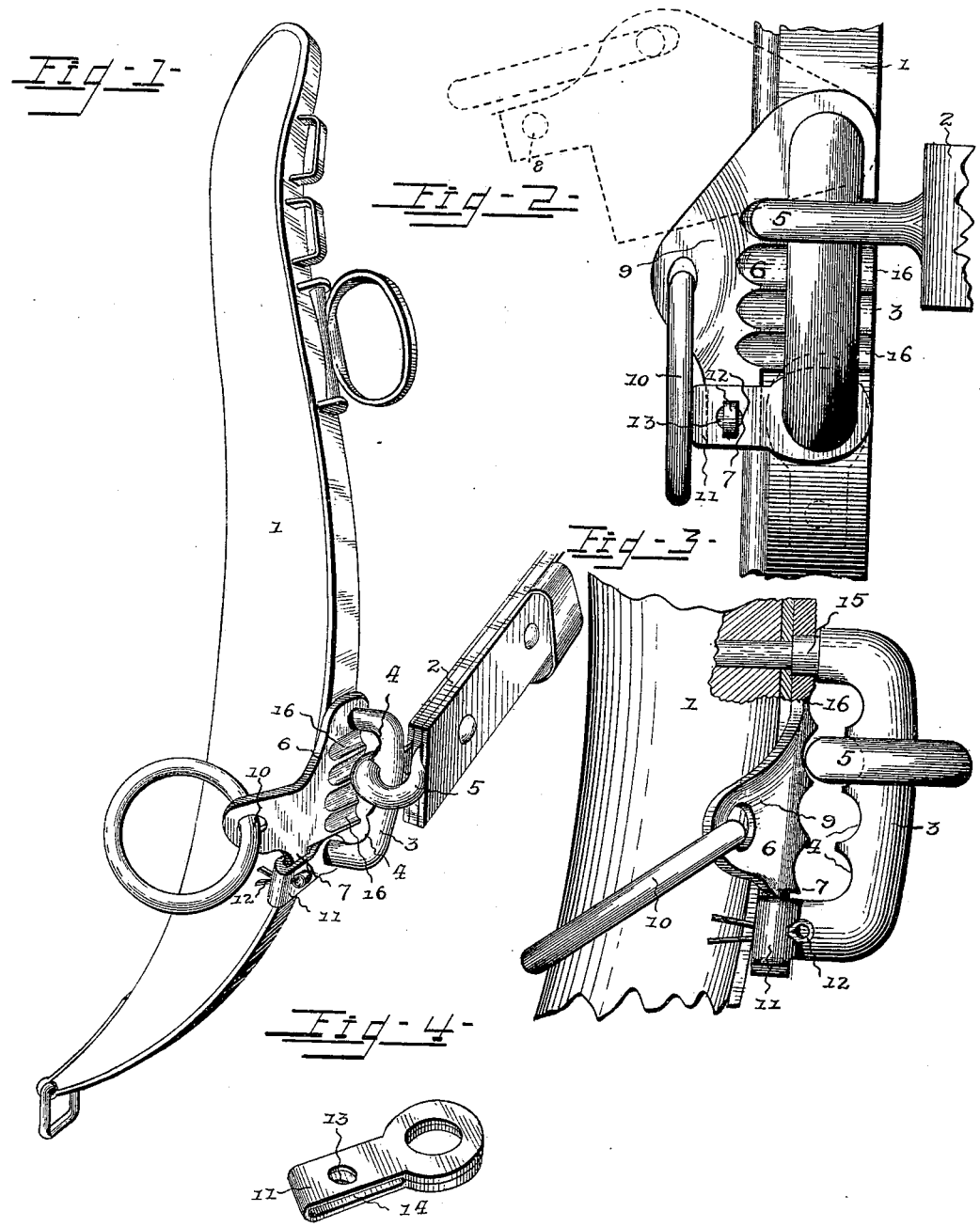

JOSEPH GOELLER, OF FAIRBURY, NEBRASKA.

HAME ATTACHMENT.

SPECIFICATION forming part of Letters Patent No. 619,825, dated February 21, 1899.

Application filed February 15, 1898. Serial No. 670,377. (No model.)

*To all whom it may concern:*

Be it known that I, JOSEPH GOELLER, a citizen of the United States, residing at Fairbury, in the county of Jefferson and State of Nebraska, have invented a new and useful Hame Attachment, of which the following is a specification.

The purpose of the present invention is to provide simple, effective, and easily-operated means which will admit of a hame-tug or trace-chain being adjusted vertically with reference to the hame to which it is attached, so as to adapt the point of draft to the shoulder of the animal to enable the latter to pull to the best possible advantage without inflicting injury or causing chafing and galling.

The essential feature of the invention consists of a plate in combination with the hame-staple, the latter being notched at its inner side to receive the hame-tug clip, the latter being held in any one of the series of notches by the locking-plate, which is mounted upon an arm of the staple and is adapted to be engaged at its opposite end by a link mounted to swing upon the opposite arm of the staple. The ring to which the breast-strap or chain is attached is applied to the locking-plate, and a fastener, such as a spring-key, is provided to secure the locking-plate and link when in engagement, so as to prevent their accidental displacement.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a hame, showing the application of the invention. Fig. 2 is an elevation of a portion of the hame having the attachment applied thereto, the full lines showing the relation of the parts when secured and the dotted lines their relative disposition when the hame-tug is released and capable of being adjusted vertically. Fig. 3 is a front view. Fig. 4 is a detail view in perspective of the link by means of which the free end of the locking-plate is secured.

Corresponding and like parts are referred to in the following description and indicated in all the views of the drawings by the same reference characters.

The hame 1 may be of any desired construction and configuration, and is provided near its lower end with the means whereby the hame-tug or trace-chain 2 is adapted to be adjustably connected therewith, so that the draft may be applied to the shoulder of the animal to secure the most advantageous result.

The hame-staple 3 is secured to the hame by having its parallel arms passing through openings formed therein, and its outer or vertical portion is provided on its inner side with a series of notches 4, which are adapted to engage positively with the hame-tug clip 5 and retain it in an adjusted position. A plate 6 of approximately triangular form is mounted upon one of the arms of the hame-staple, so as to turn thereon, and its free end is formed with an extension 7, which is apertured, as shown at 8. This plate is of a length to come between the arms of the hame-staple and is of such relative thickness as to retain the hame-tug clip 5 seated in any one of the notches 4. The outer end of the plate is deflected, as shown at 9, and is apertured to receive the ring 10, to which the breast-strap or chain is attached. The purpose of the plate 6 is to secure the hame-tug clip when adjusted and seated in any one of the notches 4 and acts in the capacity of a locking device. While the locking-plate 6 may be mounted upon either one of the arms of the hame-staple, it is preferred to have it connected with the upper arm, whereby its lower end will be held in position by gravity and by the weight of the ring 10 and the part connected therewith.

In order that the locking-plate 6 may be held against accidental displacement, it has been found expedient to provide means for engaging with its free end, and, as shown, a link 11 is loosely mounted upon the lower arm of the hame-staple, and its free end is adapted to engage with the extension 7 and is held thereto by a spring-key or like fastener 12, which latter passes through an opening 13 of the link 11 and the opening 8 of the extension 7. The outer end of the link 11 is slotted, as shown at 14, to receive the extension 7, whereby the parts are held in fixed relation when properly brought together.

When the hame is fitted to an animal and it is required to relatively adjust the hame-tug or trace-chain so as to equalize the strain upon the shoulder of the animal, the locking-plate is released and thrown up out of the way and the hame-tug clip is moved upon the outer or vertical portion of the hame-staple and is engaged with the desired notch 4 thereof. The locking-plate is now turned back into a normal position and secured by means of the link and key or fastener 12, thereby preventing vertical movement of the hame-tug clip and maintaining it in the adjusted position.

In order to admit of the locking-plate and the link turning freely upon the arms of the staple, the latter has its arms enlarged at their outer ends, as shown at 15, and these parts 15 have shoulders at their ends, the inner shoulders engaging with the hame or the iron thereof and the outer shoulders limiting the outward movement of the parts 6 and 11. The locking-plate is formed in its outer side with a series of grooves 16, corresponding in position and number with the notches 4 and which receive the end of the clip 5, the latter being confined between corresponding notches and grooves. It is to be understood that the locking-plates must be provided in pairs, the one being right and the other left. The remaining parts are duplicates.

Having thus described the invention, what is claimed, and desired to be secured by Letters Patent, is—

1. In a hame attachment, the combination with the hame, and a hame-staple having its vertical portion provided with a series of notches upon its inner side, of a locking-plate pivotally mounted upon the upper arm of the staple and adapted to be turned down into the space formed between the hame and notched portion of the staple, and formed with a forward extension deflected to overlap the forward side of the hame, and a ring applied to the forwardly-extending part of the locking-plate and serving to weight said plate, to form means of attachment therewith of the breast-strap or chain and to provide a convenient grip for operating the plate, substantially as described.

2. In a hame attachment, the combination of a hame-staple having its outer or vertical portion notched upon its inner side, a hame-tug clip adapted to be seated in any one of the notches, a locking-plate mounted upon an arm of the staple, and a link mounted upon the opposite arm of the staple and adapted to make positive engagement with the free end of the locking-plate and secure it in a normal position and prevent accidental displacement of the hame-tug clip, substantially as described.

3. In a hame attachment, the combination of a hame-staple having its outer or vertical portion provided on its inner side with a series of notches, a locking-plate mounted upon one of the arms of the staple and having an extension at its free end, a link mounted upon the other arm of the staple and adapted to make positive engagement with the extension of the locking-plate, and a fastener for securing the link and locking-plate, substantially as described.

4. In a hame attachment, the combination of a hame-staple having its outer or vertical portion formed on its inner side with a series of notches, a locking-plate of approximately triangular form mounted upon an arm of the staple and having an extension at its free end and its outer end deflected to one side and receiving a ring, a hame-tug clip adjustable upon the outer portion of the staple and adapted to be seated in any one of the notches thereof, a link mounted upon the other arm of the staple and having its outer end slotted to receive the extension of the locking-plate, and a fastener for securing the locking-plate and link together, substantially as and for the purpose described.

In testimony that I claim the foregoing as my own I have hereto affixed my signature in the presence of two witnesses.

JOSEPH GOELLER.

Witnesses:
W. W. WATSON,
E. L. CLINE.